US012482950B2

(12) United States Patent
Tian et al.

(10) Patent No.: US 12,482,950 B2
(45) Date of Patent: Nov. 25, 2025

(54) DEVICE AND A METHOD FOR AN ANTENNA WITH A CAVITY EXTENSION

(71) Applicant: HUAWEI TECHNOLOGIES CO., LTD., Shenzhen (CN)

(72) Inventors: Ruiyuan Tian, Helsinki (FI); Joonas Krogerus, Helsinki (FI); Dong Liu, Dongguan (CN); Zlatoljub Milosavljevic, Helsinki (FI)

(73) Assignee: Huawei Technologies Co., Ltd., Shenzhen (CN)

( * ) Notice: Subject to any disclaimer, the term of this patent is extended or adjusted under 35 U.S.C. 154(b) by 160 days.

(21) Appl. No.: 18/296,263

(22) Filed: Apr. 5, 2023

(65) Prior Publication Data

US 2023/0246343 A1 Aug. 3, 2023

Related U.S. Application Data

(63) Continuation of application No. PCT/EP2020/078082, filed on Oct. 7, 2020.

(51) Int. Cl.
*H01Q 13/18* (2006.01)
*H01Q 15/14* (2006.01)

(52) U.S. Cl.
CPC ............. *H01Q 13/18* (2013.01); *H01Q 15/14* (2013.01)

(58) Field of Classification Search
CPC ...... H01Q 15/14; H01Q 1/2266; H01Q 1/243; H01Q 5/40; H01Q 13/18; G06F 1/1616; G06F 1/1641; G06F 1/1677
See application file for complete search history.

(56) References Cited

U.S. PATENT DOCUMENTS

| | | | | |
|---|---|---|---|---|
| 12,119,549 | B2 * | 10/2024 | Barrera | H04R 1/02 |
| 2004/0085248 | A1 * | 5/2004 | Onaka | H01Q 9/42 343/702 |
| 2006/0061512 | A1 * | 3/2006 | Asano | H01Q 9/42 343/702 |
| 2007/0200771 | A1 * | 8/2007 | Schack | H01Q 1/243 343/702 |
| 2010/0013720 | A1 | 1/2010 | Sakata et al. | |
| 2010/0231481 | A1 * | 9/2010 | Chiang | H01Q 9/42 343/702 |
| 2012/0105294 | A1 * | 5/2012 | Chiang | H01Q 1/2266 343/789 |
| 2013/0050032 | A1 * | 2/2013 | Shiu | H01Q 1/2258 343/702 |
| 2018/0294576 | A1 | 10/2018 | Niakan et al. | |
| 2020/0195336 | A1 | 6/2020 | Raghavan et al. | |
| 2023/0246343 | A1 * | 8/2023 | Tian | H01Q 1/2266 343/702 |
| 2024/0030607 | A1 * | 1/2024 | Zhou | G06F 1/1698 |

FOREIGN PATENT DOCUMENTS

CN 209029529 U 6/2019

* cited by examiner

*Primary Examiner* — Jason M Crawford
(74) *Attorney, Agent, or Firm* — Leydig, Voit & Mayer, Ltd.

(57) ABSTRACT

A foldable mobile device is provided. The device includes an antenna cavity substantially enclosed by at least four conductor walls, and a gap between two substantially perpendicular conductor walls at a first side of the antenna cavity. The device further includes a cavity extension extending at a direction substantially perpendicular to the first side of the cavity and aligned with the gap. Devices, methods, and a non-transitory computer-readable medium are disclosed.

15 Claims, 5 Drawing Sheets

DEVICE AND A METHOD FOR AN ANTENNA WITH A CAVITY EXTENSION

CROSS-REFERENCE TO RELATED APPLICATIONS

This application is a continuation of International Application No. PCT/EP2020/078082, filed on Oct. 7, 2020, the disclosure of which is hereby incorporated by reference in its entirety.

FIELD

The present disclosure generally relates to the field of wireless communications. In particular, some embodiments of the disclosure relate to design of cavity antennas.

BACKGROUND

The number of antennas in small mobile devices has been continuously increasing along with the frequency band allocated for radio communications, while the volume reserved for the antennas has remained the same or even reduced. As a consequence, antennas easily become inefficient, thereby significantly lowering the achievable data rate and coverage. At least a part of a metal frame of a handset may be used as an antenna radiator. One design option is to extend the size of the display to cover the whole front face of the device. This will decrease the usable antenna volume. Thus, it is very demanding to achieve sufficient antenna performance over the required frequency bands. Furthermore, for devices with a foldable display mechanism, antennas need to function in both in a "fold" and an "open" state of the device, thus further limiting the design freedom to achieve required antenna performance.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure provides a device enabling sufficient antenna performance in mobile devices with a limited space available for the antennas. The embodiments of the disclosure provide an antenna design which enables exploiting structure of a foldable mobile device such that a usable antenna volume in the foldable device may be increased without excessively affecting the antenna performance.

The foregoing and further implementations may be achieved by the features of the independent claims, dependent claims, the description, and the drawings.

According to a first aspect, a device for radio frequency communications is provided. The device may comprise an antenna cavity substantially enclosed by at least four conductor walls; a gap between two substantially perpendicular conductor walls at a first side of the antenna cavity; and a cavity extension extending at a direction substantially perpendicular to the first side of the antenna cavity and aligned with the gap. This solution improves achievable performance and volume of antennas in mobile devices. The device enables to overcome antenna design limitations arising from use of displays covering a whole front face of a device as well as from foldable display mechanisms. This is enabled by extending the cavity in alignment with the gap.

According to an implementation form of the first aspect, the cavity extension may extend from a second side of the antenna cavity opposite to the first side of the antenna cavity. The cavity extension may be closed at an end of the cavity extension. This solution enables increasing antenna performance. Further, a resonant frequency of the cavity antenna may be tuned with a size of the cavity extension. Alternatively, or in addition, the solution enables reducing a size of the antenna cavity required for particular resonant frequency.

According to an implementation form of the first aspect, the cavity extension may extend from the first side of the antenna cavity. The cavity extension may be open at an end of the cavity extension. This solution enables using the cavity extension as a guiding mechanism for an electromagnetic field excited by an antenna feed of the device.

According to an implementation form of the first aspect, the device may further comprise a first frame and a second frame coupled by a folding mechanism. The antenna cavity may be located in proximity of the folding mechanism in the first frame, wherein the cavity extension extends away from the folding mechanism. This solution enables improving antenna performance in a folded state of the device by guiding the excited electromagnetic field away from the folding mechanism. Further, volume of antennas in foldable devices may be increased by enabling improved utilization of the side of the frame with the folding mechanism as a possible location for the antennas with the design of antenna cavities with cavity extensions.

According to an implementation form of the first aspect, the second frame may comprise a conductor wall configured to form a cover for at least part of the cavity extension when the device is in a folded state. This solution enables the cavity extension to be formed when the device is folded. Hence, the antenna design in mobile devices with folding displays may be improved by utilizing a space within the folding display mechanism to accommodate the cavity extension in the folded state of the device. The resonant frequency of the antenna cavity is not substantially affected by the size of the cavity extension when the gap is located on the same side of the antenna cavity as the cavity extension. This enables to maintain similar antenna performance regardless of whether the device is in folded or unfolded state.

According to an implementation form of the first aspect, the device may comprise a plurality of said antenna cavities in proximity of the folding mechanism. Hence, improved antenna performance and diversity may be provided by exploiting the space in proximity of the folding mechanism.

According to an implementation form of the first aspect, the first frame may comprise at least one of the plurality of said antenna cavities and the second frame may comprise at least one of the plurality of said antenna cavities. Hence, the antenna cavities may be located on spaces available on both sides of the folding mechanism. This enables volume of antennas on the device to be increased.

According to an implementation form of the first aspect, at least two of the plurality of said antenna cavities may be configured to operate at different frequencies. This solution enables avoiding coupling of the antenna cavities when the device is folded.

According to an implementation form of the first aspect, at least one of the plurality of said antenna cavities may be configured to be switched off in the folded state. This solution enables avoiding coupling of the antenna cavities when the device is folded.

According to an implementation form of the first aspect, the at least one of the plurality of said antenna cavities in the first frame may be configured to operate at a same frequency as the at least one of the plurality of said antenna cavities in the second frame and the at least one of the plurality of said antenna cavities operating at the same frequency in the first frame may be configured to be switched off in the folded state. This enables avoiding coupling of the antennas operating at the same frequency in the different frames.

According to an implementation form of the first aspect, the cavity extension may extend in the first frame or the second frame between an inner component of the device and a surface opposite to a display of the device. This solution improves use of space for the antennas in the foldable device while the cavity extension may be accommodated in the space within the folding display mechanism.

According to an implementation form of the first aspect, the first frame may comprise a first portion of the display and the second frame may comprise a second portion of the display. The cavity extension may be ended at a portion of the first frame, wherein the first portion of the display and the second portion of the display do not overlap at the portion of the first frame in the folded state. This solution improves radiation from the open end of the cavity extension.

According to an implementation form of the first aspect, a gap or a cavity extension of the at least one of the plurality of antenna cavities in the first frame and a gap or a cavity extension of the at least one of the plurality of antenna cavities in the second frame may be towards opposite directions away from the folding mechanism when the device is in an unfolded state. Hence, antennas may operate simultaneously even when they are on the same frequency.

According to an implementation form of the first aspect, the cavity extension may extend between an inner component of the device and a surface opposite to a display of the device. This solution improves use of space for the antennas in non-foldable devices.

According to an implementation form of the first aspect, the device may comprise a non-foldable device. This solution improves antenna performance in non-foldable devices. Further, the use of space of antennas in non-foldable devices may be enhanced as the cavity extension enables reducing the size of the antenna cavity.

According to a second aspect, a method for operating a device for radio frequency communications is provided. The method may comprise detecting a folded state of a device according to the first aspect; and switching off at least one of the plurality of antenna cavities of the device in response to detecting the folded state. This solution enables use of the antennas on both sides of the folding mechanism of the device while avoiding coupling of the cavity antennas when placed on top of each other.

According to a third aspect, there is provided a computer program comprising program code configured to cause performance of the method according to the second aspect, when the computer program is executed on a computer.

According to an implementation form of the third aspect, the computer program is embodied in a computer readable medium.

Implementation forms of the present disclosure can thus provide a device, a method and a computer program for radio frequency communications. These and other aspects of the present disclosure will be apparent from the example embodiment(s) described below.

BRIEF DESCRIPTION OF THE DRAWINGS

The accompanying drawings, which are included to provide a further understanding of the example embodiments and constitute a part of this specification, illustrate example embodiments and, together with the description, help to explain the example embodiments. In the drawings.

Like references are used to designate like parts in the accompanying drawings.

DETAILED DESCRIPTION

Figure 1:
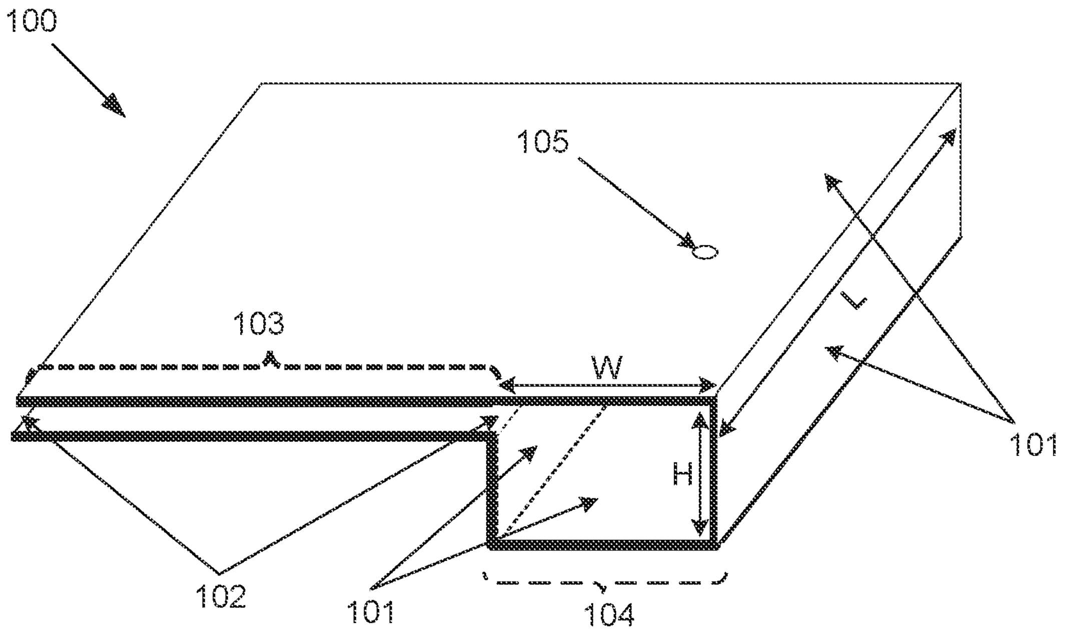
FIG. 1 illustrates an example of an antenna cavity coupled with an open-end cavity extension, according to an embodiment of the disclosure.

Reference will now be made in detail to example embodiments, examples of which are illustrated in the accompanying drawings. The detailed description provided below in connection with the appended drawings is intended as a description of the present embodiments and is not intended to represent the only forms in which the present examples may be constructed or utilized. The description sets forth the functions of the examples and the sequence of operations for constructing and operating the examples. However, the same or equivalent functions and sequences may be accomplished by different examples.

A predetermined location and available volume for antennas in a mobile device can set strict limitations for mobile antenna design. Antenna elements may be located in the top and/or bottom part of the device. Further, the antenna elements may be placed over a certain distance (clearance) in order to achieve a required impedance bandwidth and other antenna radiation performance requirements.

A display of the mobile device may be enclosed by a metal frame, which may be used at least partly as an antenna radiator. The metal frames may have cuts/gaps in order to realize the length that different antennas may require. One design option is to extend the size of the display to cover the whole front face of the mobile device. This decreases the usable antenna volume. There is a close correlation between achievable impedance bandwidth, total efficiency and available antenna clearance. The achievable bandwidth and efficiency may be improved by increasing the ground clearance and an optimal clearance depends on the frequency.

For example, an antenna, such as a capacitive coupling element (CCE) antenna, an inverted F-antenna or a monopole/inverted L-antenna, may be applied in a device with a rectangular-shaped display, where all four sides of the device are designed with a number of gaps/cuts to realize many different antennas. However, this becomes very challenging for devices with a foldable display mechanism. In a foldable device, there may be only three sides of the frame that can be used to design the antennas. The folding hinge makes the fourth-side of the frame challenging to use for antennas in order to implement the folding display structure. Further, since the device needs to function in both "fold" and "open" states, it is very challenging to use both two frames of the foldable device independently for antenna design. The problem applies to both folding directions, i.e. from left to right folding direction, wherein the folding hinge is located on one vertical side of the frames of the foldable device, and from up to down folding direction, wherein the folding hinge is located on one horizontal side of the frames. The display may be located on either side of the frames. Antennas may be designed using the three sides of the first frame, and the three sides of the second frame may be made symmetrical to the first frame, so that the required gaps/cuts would not interfere antennas that are designed in the first frame. Another approach is to introduce a so-called bar area so that the frames do not fully overlap with each other when the device is folded. This can help to design sufficient number antennas in the bar area, which are not affected by the folding mechanism. However, if many antennas are placed in the bar area, that is, at only one side of the first frame, the antenna performance may be limited by achievable isolation among the antennas. Performance of many antennas may be also affected when a hand of a user of the device holds the bar.

An antenna cavity may comprise a structure produced by warping a conductor around a dielectric material. The conductor may enclose at least four surfaces filled with the dielectric material such that there is a gap between a vertical and a horizontal cavity wall on one side of the antenna cavity. The antenna cavity may be excited by a voltage source (antenna feed) configured between two horizontal walls enclosed by the conductor. The resonance frequencies of the excited antenna cavity are determined by dimensions of the cavity (length/width/height) and the location of the antenna feed. Antenna matching may be achieved by designing the gap as well.

According to an embodiment, an antenna cavity is extended to improve design freedom of the antennas in mobile devices. The cavity extension may be used to design a resonance frequency of the antenna cavity. The antenna cavity may be enclosed by at least four conductor walls. The antenna cavity may comprise a gap between two substantially perpendicular conductor walls at a first side of the antenna cavity. The antenna cavity may further comprise a cavity extension at a direction substantially perpendicular to the first side of the antenna cavity and aligned with the gap. The cavity extension may extend from the same side of the antenna cavity as the location of the gap or from an opposite side of the antenna cavity than the location of the gap. The extension direction of the cavity extension as well as location of the gap may depend on whether the antenna is used in a non-foldable device or in a foldable device. The cavity extension may be open or closed from an end of the cavity extension, for example depending on which kind of device it is used in. In an embodiment, one or more antenna cavities with the cavity extension may be designed in an internal mechanical structure of a foldable device in proximity of a folding mechanism of the foldable device. Former limitations in antenna design arising from the foldable mechanism may be turned into a supporting feature by exploiting the foldable mechanism such that the cavity extension is formed when folding the device.

FIG. 1 illustrates an example of an antenna cavity 104 coupled with an open-end cavity extension 103, according to an embodiment of the disclosure. A device 100 may comprise the antenna cavity 104 with the cavity extension 103. In an embodiment, the device 100 may be an antenna. The antenna cavity 104 may be substantially enclosed by at least four conductor walls 101. In an embodiment, the cavity extension 103 extends from a first side of the antenna cavity 104. The antenna cavity 104 and the cavity extension 103 may form an extended antenna cavity, for example a continuous space within the conductor walls 101 of the antenna cavity 104 and conductor walls of the cavity extension 103. The antenna cavity 104 may comprise a gap 102 between two substantially perpendicular conductor walls 101 of the antenna cavity 104 at the first side. The cavity extension 103 may be open at an end of the cavity extension 103. In other words, the gap 102 may be also present in the open end of the cavity extension 103. The antenna cavity 104 may comprise an antenna feed 105 between two horizontal conductor walls 101.

Figure 2:
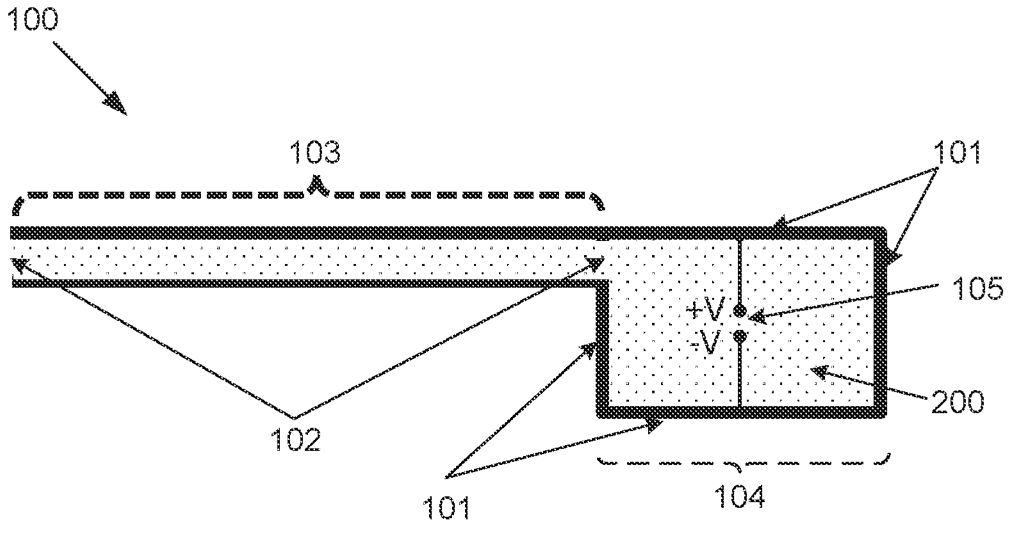
FIG. 2 illustrates an example of a side-cut view of an antenna cavity coupled with an open-end cavity extension, according to an embodiment of the disclosure.

The antenna cavity 104 may have a cuboidal shape determined by the conductor walls 101 and having a height (H), a width (W), and a length (L) dimension. The antenna cavity 104 may therefore have a rectangular cross-section with respect to any of the dimensions. The antenna cavity 104 may be open (as illustrated in FIG. 1) or closed at the ends of the cuboid. Dominant design parameters of the antenna may be related to the dimensions of the antenna cavity 104 and the location of the antenna feed 105. Therefore, a resonant frequency of the antenna may not be substantially affected by the size of the cavity extension 103. The open-end cavity-extension 103 functions as a guiding mechanism for an electromagnetic field that is excited by the antenna feed 105. In an embodiment, the device 100 may comprise a foldable device. FIG. 2 illustrates a side-cut view of the device 100. The conductor walls 101 may surround dielectric material 200, such as air. The dielectric material 200 may be also provided inside the cavity extension 103.

Figure 3:
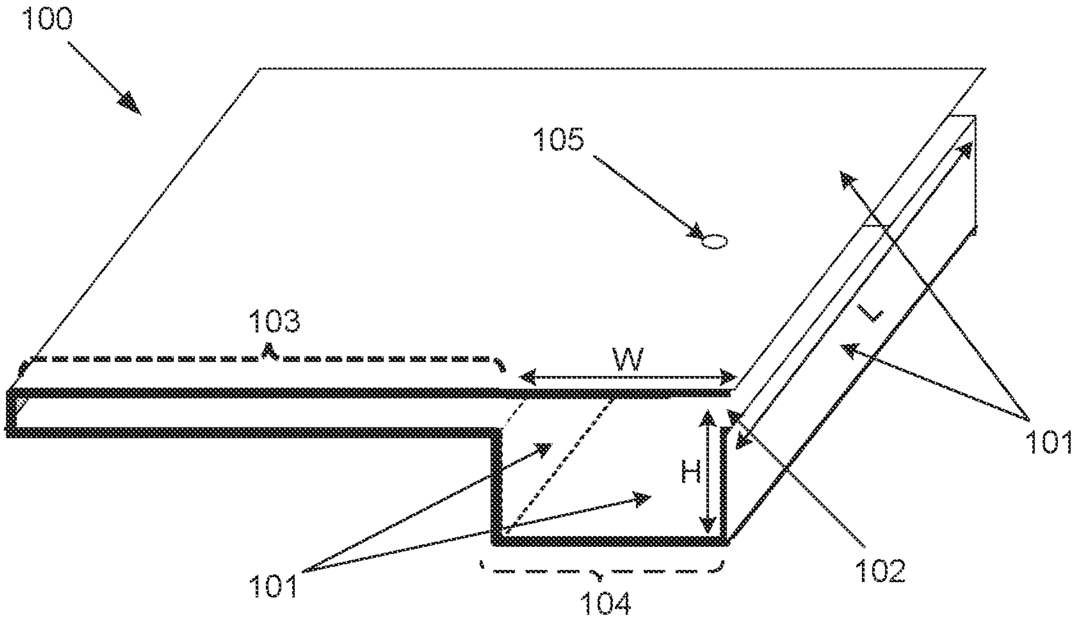
FIG. 3 illustrates an example of an antenna cavity coupled with a closed-end cavity extension, according to an embodiment of the disclosure.
Figure 4:
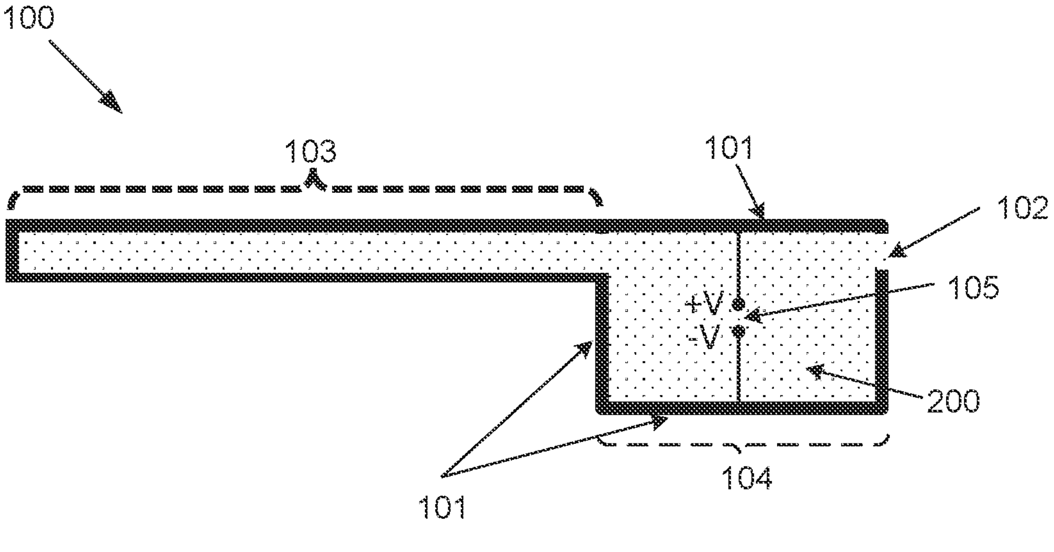
FIG. 4 illustrates an example of a side-cut view of an antenna cavity coupled with a closed-end cavity extension, according to an embodiment of the disclosure.

FIG. 3 illustrates an example of an antenna cavity 104 coupled with a closed-end cavity extension 103, according to an embodiment of the disclosure. A device 100 may comprise the antenna cavity 104 with the cavity extension 103. The antenna cavity 104 and the cavity extension 103 may form an extended antenna cavity, as discussed above. In an embodiment, the device 100 may be an antenna. The antenna cavity 104 may be substantially enclosed by at least four conductor walls 101. In an embodiment, the cavity extension 103 extends from a second side of the antenna cavity 104. The antenna cavity 104 may comprise a gap 102 between two substantially perpendicular conductor walls 101 of the antenna cavity 104 at a first side of the antenna cavity 104. The first side may be opposite to the second side. The cavity extension 103 may be closed at an end of the cavity extension 103. A beginning of the cavity extension 103 may be open such that a uniform space is surrounded by the conductor walls 101. The antenna cavity 104 may comprise an antenna feed 105 between two horizontal conductor walls 101. The space formed by the antenna cavity 104 and the cavity extension 103 may be filled by a dielectric material 200, as shown in a side-cut view of the device 100 in FIG. 4.

The antenna cavity 104 may have a cuboidal shape determined by the conductor walls 101 and having a height (H), a width (W) and a length (L) dimension. In comparison to an antenna cavity not being coupled with a cavity extension, the dimensions of the antenna cavity 104 may be decreased if the size of the cavity extension 103 is increased. For example, width of the antenna cavity 104 may be reduced by half with a relatively narrow extension of the antenna cavity 104 increasing performance of the antenna. A resonance frequency of the antenna may be tuned lower with a larger cavity extension 103. In an embodiment, the device 100 may comprise a non-foldable device. In the non-foldable device, the antenna cavity 104 may be located on a first side of the non-foldable device. The cavity extension 103 may extend between an inner component of the non-foldable device and a surface opposite to a display of the non-foldable device towards a second side of the non-foldable device.

Figure 5:
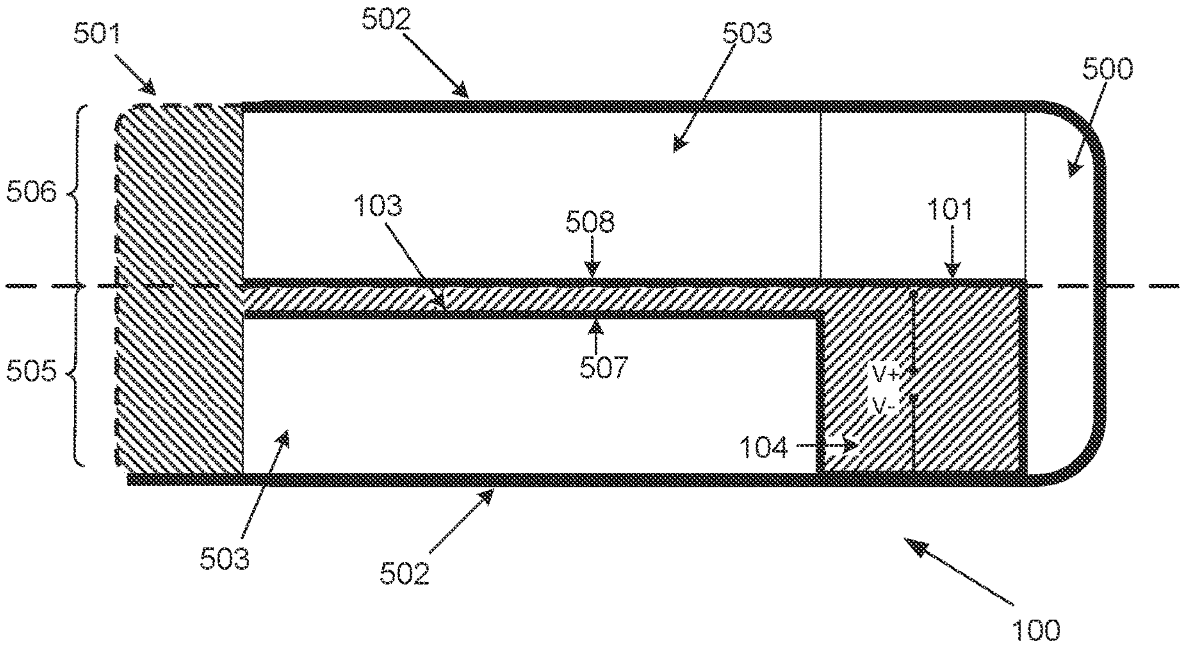
FIG. 5 illustrates an example of a foldable device comprising an antenna cavity with a cavity extension wherein the foldable device is in a folded state, according to an embodiment of the disclosure.

FIG. 5 illustrates an example of a foldable device comprising an antenna cavity 104 coupled with a cavity extension 103 wherein the foldable device is in a folded state, according to an embodiment of the disclosure. The foldable device may comprise the device 100.

In an embodiment, the device 100 comprises a first frame 505 and a second frame 506 coupled by a folding mechanism 500. The antenna cavity 104 may be located in proximity of the folding mechanism 500 in the first frame 505. The cavity extension 103 may extend away from the folding mechanism 500. Alternatively, or in addition, the antenna cavity 104 may be located in proximity of the folding mechanism in the second frame 506. In an embodiment, the cavity extension 103 extends in the first frame 505 and/or the second frame 506 between an inner component 503 of the device 100 and a surface opposite to a display 502 of the device 100. The inner component 503 may comprise, for example, a battery of the device 100. The cavity extension 103 may be located between the battery and a casing of the device 100.

The display 502 may cover one side of the device 100. The display 502 may substantially surround an outside of the device 100 when in the folded state. The first frame 505 may comprise a first portion of the display 502 and the second frame 506 may comprise a second portion of the display 502. The cavity extension 103 may end at a portion 501 of the first frame 505, wherein the first portion of the display 502 and the second portion of the display 502 do not overlap at the portion 501 in the folded state. The portion 501 may comprise a bar area of the device, where the portions of the display 502 do not overlap in the folded state, as illustrated in FIG. 5. The portion 501 of the first frame 505 at which the portions of the display 502 do not overlap may be further utilized to provide a space for other antenna(s), for example CCE antenna(s), inverted F-antenna(s), or monopole antenna(s), and/or inverted L-antenna(s). The antenna cavity 104 may operate as a source of electromagnetic radiation when the antenna is excited by an antenna feed locating between horizontal conductor walls of the antenna cavity 104. The cavity extension 103 may operate as a guiding mechanism for the electromagnetic radiation. Further, the portion 501 may operate as an open route for the electromagnetic radiation.

Figure 6:
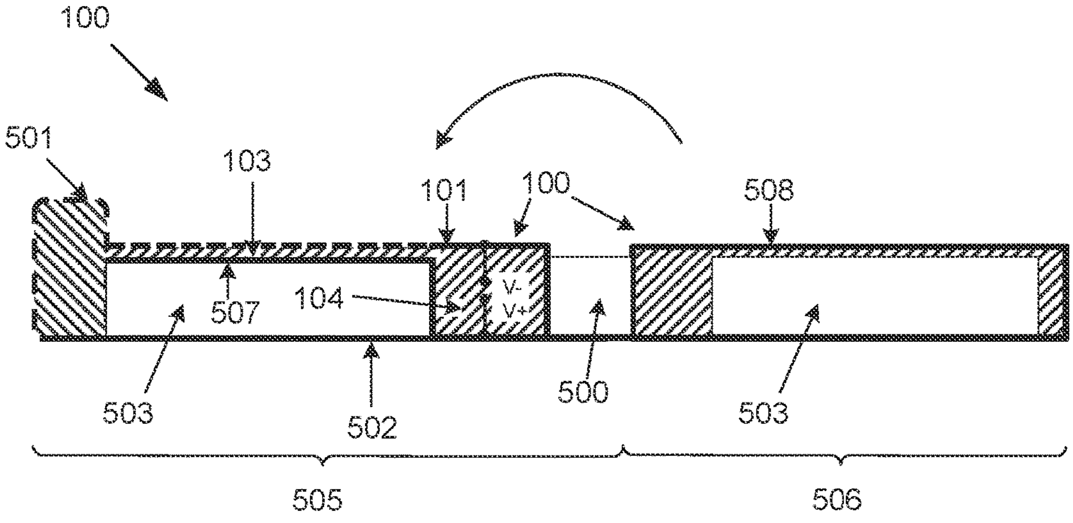
FIG. 6 illustrates an example of a foldable device comprising an antenna cavity extendable by a cavity extension, wherein the foldable device is in an unfolded state, according to an embodiment of the disclosure.

Advantageously, the side of the first frame 505 with the folding mechanism 500 may be utilized for the antenna design such that operation of the antenna may not be affected when the device 100 is opened or folded. At least one of the first frame 505 or the second frame 506 may comprise a conductor wall 508 configured to form a cover for at least part of the cavity extension 103 when the device 100 is folded, for example, from the unfolded state illustrated in FIG. 6 to the folded state illustrated in FIG. 5. Hence, when the device 100 is unfolded, the antenna cavity 104 operates as a cavity antenna without the extension. Further, the cavity extension 103 may be formed as soon as the device 100 is in the folded state. In the folded state, the conductor wall 508 comprised in the first or second frame 505, 506 without the respective antenna cavity 104, is placed on top of the first or second frame 505, 506 with the antenna cavity 104 to form a continuation to a top conductor wall 101 of the antenna cavity 104 aligned with a base conductor wall 507 of the cavity extension 103. Placing the antenna cavity 104 in proximity of the folding mechanism may provide robust in-hand performance, wherein performance of the antenna is not substantially affected when a user of the device 100 holds the device 100 in his or her hand.

Figure 7:
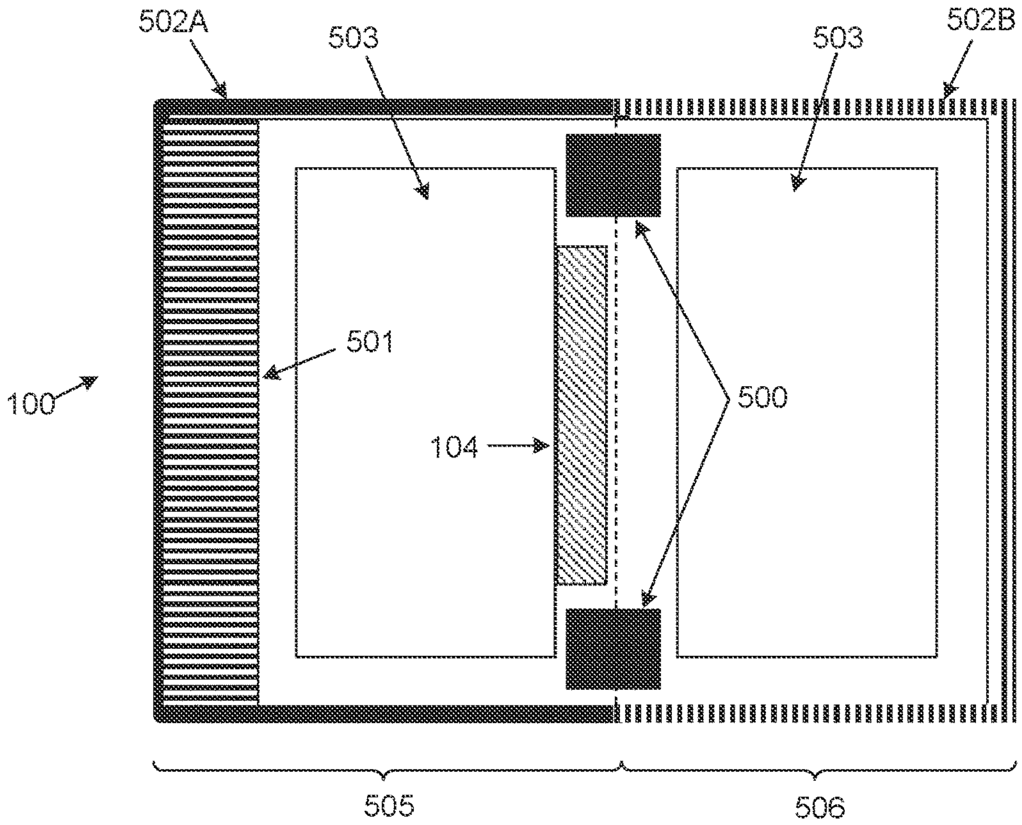
FIG. 7 illustrates an example of a foldable device comprising an antenna cavity in proximity of a folding mechanism of the foldable device, according to an embodiment of the disclosure.

FIG. 7 illustrates an example of a foldable device comprising an antenna cavity 104 in proximity of a folding mechanism 500 of the foldable device, according to an embodiment of the disclosure. The foldable device may comprise the device 100.

The device 100 may comprise a first frame 505 and a second frame 506. The device 100 may comprise a display covering one side of the device 100 in the unfolded state, wherein a first portion of the display 502A is comprised in the first frame 505 and a second portion of the display 502B is comprised in the second frame 506. The first frame 505 may comprise a portion 501 wherein the first and the second portion of the display 502A, 502B do not overlap in the folded state. The antenna cavity 104 substantially surrounded by a conductor may be located next to a folding mechanism 500 configured for folding of the device 100. The folding mechanism 500 may comprise one or more hinges. The device 100 may further comprise at least one inner component 503, such as a battery, and the antenna cavity 104 may be located between the folding mechanism 500 and the inner component 503. The portion 501 may extend one side of the first frame 505 opposite to the side of the folding mechanism 500. The antenna cavity 104 may comprise a cavity extension (not shown in FIG. 7) which may extend across the first frame 505 and end at the first portion 501. The cavity extension may be formed when the second frame 506 is folded on top of the first frame 505. The second frame 506 may comprise a conductor wall configured to complete the cavity extension. The conductor wall comprised in the second frame 506 may supplement the antenna cavity 104 by providing an extension to a top horizontal conductor wall of the antenna cavity 104.

Figure 8:
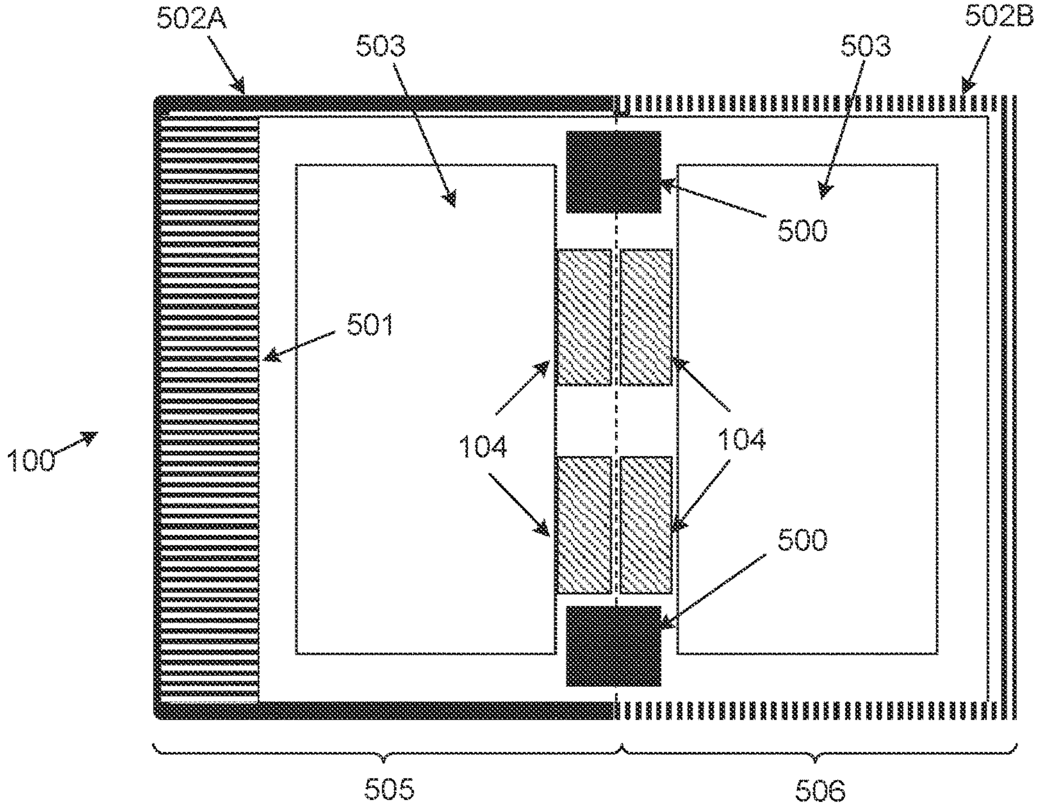
FIG. 8 illustrates an example of a foldable device comprising multiple antenna cavities on both sides of a folding mechanism of the foldable device, according to an embodiment of the disclosure.

FIG. 8 illustrates an example of a foldable device comprising multiple antenna cavities 104 on both sides of a folding mechanism 500 of the foldable device, according to an embodiment of the disclosure. The device 100 may correspond to the device 100 in FIG. 7, but here the device 100 comprises a plurality of antenna cavities 104 wherein both the first frame 505 and the second frame 506 comprises at least one of the plurality of antenna cavities 104. A gap or a cavity extension of the at least one of the plurality of antenna cavities 104 in the first frame 505 and a gap or a cavity extension of the at least one of the plurality of antenna cavities 104 in the second frame 506 may be towards opposite directions away from the folding mechanism 500 when the device is in an unfolded state. Both the first frame 505 and the second frame 506 may comprise at least one conductor wall configured to form a cover to one or more cavity extensions when the device 100 is in the folded state. In an embodiment, a side of the device 100 opposite to the display 502A, 502B comprises metal, wherein the metal operates as the conductor wall configured to form the cover for the cavity extension(s). In an embodiment, at least two of the plurality of antenna cavities 104 are configured to operate at different frequencies. Alternatively, or in addition, at least one of the plurality of antenna cavities 104 may be configured to be switched off in the folded state. In an embodiment, at least one of the plurality of antenna cavities 104 in the first frame 505 is configured to operate at a same frequency as the at least one of the plurality of antenna cavities 104 in the second frame 506. The at least one of the plurality of antenna cavities 104 operating at the same frequency in the first frame 505 may be configured to be switched off in the folded state. Hence, coupling of the antenna cavities may be avoided when the device 100 is folded. Further, the antenna cavities which are switched off when the device 100 is folded may act as auxiliary devices to boost operation of the rest of the antenna cavities 104.

Figure 9:
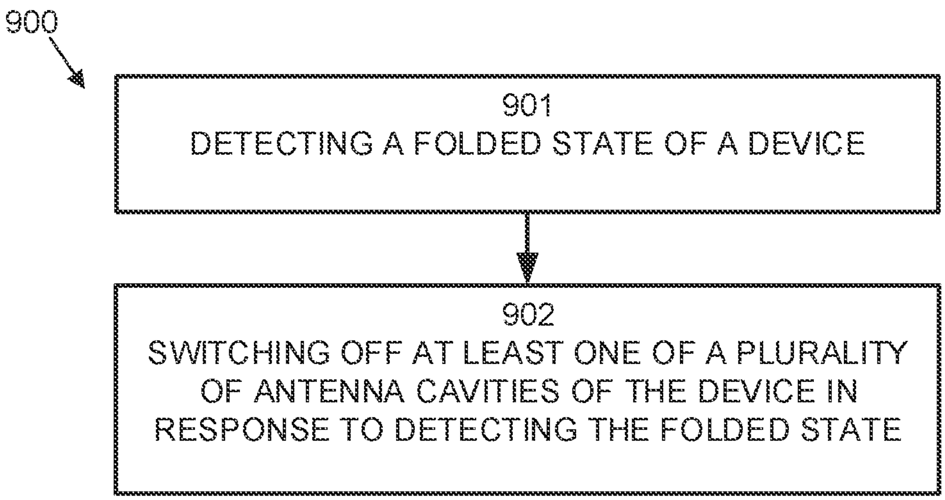
FIG. 9 illustrates an example of a method for operating a device for radio frequency communications, according to an embodiment of the disclosure.

FIG. 9 illustrates an example of a method 900 for operating a device 100 for radio frequency communications, according to an embodiment of the disclosure. The device 100 comprises a plurality of antenna cavities 104 and is configured to provide at least one cavity extension 103 as describer earlier.

At 901, the method comprises detecting a folded state of the device 100. The folded state may be detected, for example, in response to receiving an indication of the folded state from a sensor of the device 100.

At 902, the method comprises switching off at least one of the plurality of antenna cavities of the device 100 in response to detecting the folded state. Hence, functioning of the antenna cavities 104 configured for radio frequency communications may not be disturbed when the device is in the folded state and the antenna cavities located in different frames are placed close to each other.

Further features of the methods directly result from the functionalities and parameters of the methods and devices, for example the device 100, as described in the appended claims and throughout the specification and are therefore not repeated here.

A device or a system may be configured to perform or cause performance of any aspect of the method(s) described herein. Further, a computer program may comprise program code configured to cause performance of an aspect of the method(s) described herein, when the computer program is executed on a computer. Further, the computer program product may comprise a computer readable storage medium storing program code thereon, the program code comprising instruction for performing any aspect of the method(s) described herein. Further, a device may comprise means for performing any aspect of the method(s) described herein. According to an example embodiment, the means comprises at least one processor, and at least one memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the exemplary features or acts described above. Rather, the exemplary features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items. Furthermore, references to 'at least one' item or 'one or more' items may refer to one or a plurality of those items.

The operations of the methods described herein may be carried out in any suitable order, or simultaneously where appropriate. Additionally, individual blocks may be deleted from any of the methods without departing from the scope of the subject matter described herein. Aspects of any of the embodiments described above may be combined with aspects of any of the other embodiments described to form further embodiments without losing the effect sought.

The term 'comprising' is used herein to mean including the method, blocks, or elements identified, but that such blocks or elements do not comprise an exclusive list and a method or device may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

What is claimed is:

1. A device for radio frequency communications, the device comprising:

an antenna cavity enclosed by at least four conductor walls;

a gap between two perpendicular conductor walls at a first side of the antenna cavity;

a cavity extension extending at a direction perpendicular to the first side of the antenna cavity and aligned with the gap, wherein the cavity extension extends from the first side of the antenna cavity, and wherein the cavity extension is open at an end of the cavity extension; and a first frame and a second frame coupled by a folding mechanism, wherein the antenna cavity is located in proximity of the folding mechanism in the first frame, and wherein the cavity extension extends away from the folding mechanism.

2. The device of claim 1, wherein the second frame comprises a conductor wall configured to form a cover for at least part of the cavity extension based on that the device is in a folded state.

3. The device of claim 1, wherein the device comprises a plurality of antenna cavities in proximity of the folding mechanism, each of the antenna cavities having a same construction as the antenna cavity, the plurality of antenna cavities comprising the antenna cavity.

4. The device of claim 3, wherein the first frame comprises at least one of the plurality of the antenna cavities and the second frame comprises at least one of the plurality of the antenna cavities.

5. The device of claim 4, wherein the at least one of the plurality of the antenna cavities in the first frame is configured to operate at a same frequency as the at least one of the plurality of the antenna cavities in the second frame and the at least one of the plurality of the antenna cavities operating at the same frequency in the first frame is configured to be switched off in a folded state.

6. The device of claim 4, wherein a gap or a cavity extension of the at least one of the plurality of antenna cavities in the first frame and a gap or a cavity extension of the at least one of the plurality of antenna cavities in the second frame are towards opposite directions away from the folding mechanism based on that the device is in an unfolded state.

7. The device of claim 3, wherein at least two of the plurality of the antenna cavities are configured to operate at different frequencies.

8. The device of claim 3, wherein at least one of the plurality of the antenna cavities is configured to be switched off in a folded state.

9. The device of claim 1, wherein the cavity extension extends in the first frame or the second frame between an inner component of the device and a surface opposite to a display of the device.

10. The device of claim 9, wherein the first frame comprises a first portion of the display and the second frame comprises a second portion of the display, and wherein the cavity extension is ended at a portion of the first frame, wherein the first portion of the display and the second portion of the display do not overlap at the portion of the first frame based on that the device is in a folded state.

11. A method for operating a device for radio frequency communications, the method comprising:

detecting a folded state of the device; and switching off at least one of a plurality of antenna cavities of the device in response to detecting the folded state, and wherein the device comprises:

an antenna cavity enclosed by at least four conductor walls;

a gap between two perpendicular conductor walls at a first side of the antenna cavity; and a cavity extension extending at a direction perpendicular to the first side of the antenna cavity and aligned with the gap.

12. The method of claim 11, wherein the device further comprises a first frame and a second frame coupled by a folding mechanism, wherein the antenna cavity is located in proximity of the folding mechanism in the first frame, and wherein the cavity extension extends away from the folding mechanism.

13. The method of claim 12, wherein the plurality of antenna cavities are located in proximity of the folding mechanism.

14. A non-transitory computer-readable medium, having computer-executable instructions stored thereon, the computer-executable instructions, when executed by one or more processors, cause a device for radio frequency communications to:

detect a folded state of the device; and switch off at least one of a plurality of antenna cavities of the device in response to detecting the folded state, and wherein the device comprises:

an antenna cavity enclosed by at least four conductor walls;

a gap between two perpendicular conductor walls at a first side of the antenna cavity; and a cavity extension extending at a direction perpendicular to the first side of the antenna cavity and aligned with the gap.

15. The non-transitory computer-readable medium of claim 14, wherein the device further comprises a first frame and a second frame coupled by a folding mechanism, wherein the antenna cavity is located in proximity of the folding mechanism in the first frame, wherein the cavity extension extends away from the folding mechanism, and wherein the plurality of antenna cavities are located in proximity of the folding mechanism.

* * * * *